Aug. 9, 1966  H. ERHARD  3,265,168
HANDLE CONSTRUCTION
Filed Dec. 20, 1963
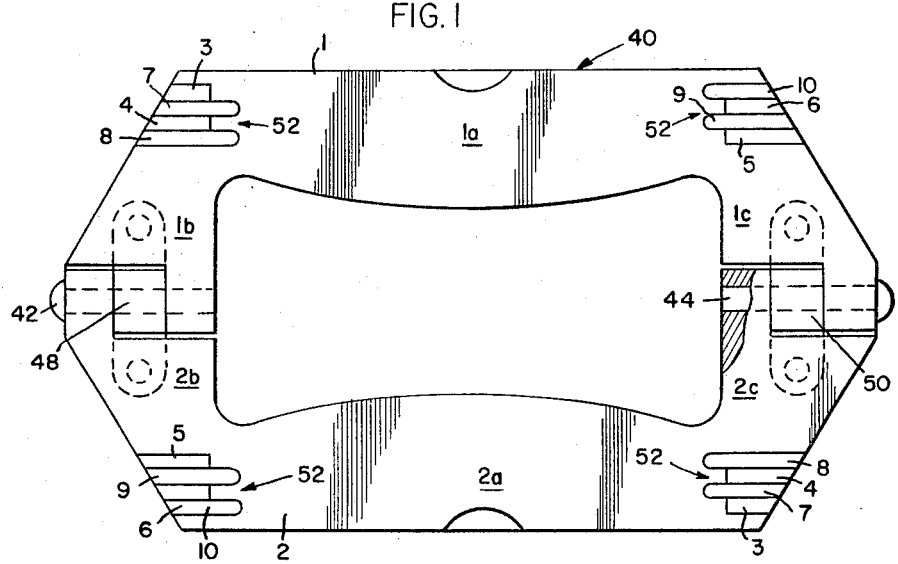
FIG. 1
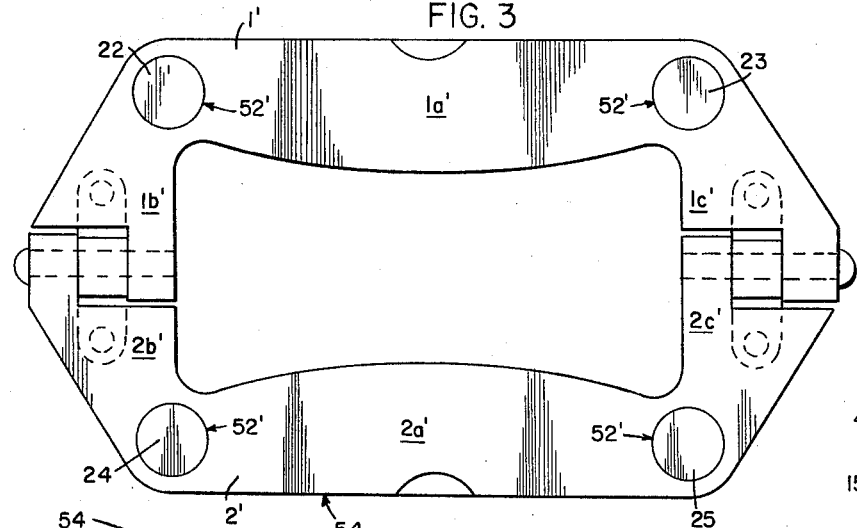
FIG. 3
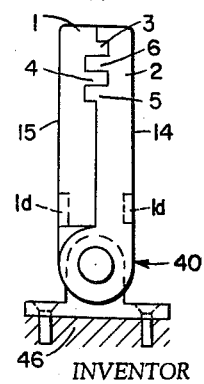
FIG. 2
FIG. 4    FIG. 5
INVENTOR
HERMANN ERHARD
BY Mulglow and Toren
ATTORNEYS

United States Patent Office 3,265,168
Patented August 9, 1966

3,265,168
HANDLE CONSTRUCTION
Hermann Erhard, Landauer Strasse 3,
Berlin-Wilmersdorf, Germany
Filed Dec. 20, 1963, Ser. No. 332,214
5 Claims. (Cl. 190—57)

This invention relates in general to handle construction, and in particular to a new and useful handle particularly for suitcases having two pivotal handle portions with opposing bearing surfaces provided with means for securing the handle portions together for grasping as a single unit and permitting separation of the handle portions for holding the individual portions separately.

The handle construction of the present invention is particularly applicable for use on suitcases, or luggage, in which it is desirable to permit the handles to be used as a single handle unit for carrying by one person, or to permit the handle portions to be disengaged for carrying by two persons, each gripping one of the handle portions. Handles of this nature have been constructed heretofore, but a disadvantage of such constructions is that the securing means which are formed on the opposing contact surfaces of the handle portions is situated in the region of the hand, that is where the hand grips the handle, and thus means interferes with proper carrying of the suitcase.

In one type of prior art construction, the individual handle portions are rotatably mounted so that any projections or gearings which form the securing means may be turned upwardly in order to position a rounded handle portion downwardly for grasping by the palm of one's hand when the handle portions are separated. A disadvantage of handles of this type, in addition to the formation of projections at the hand gripping area, is that they must be secured against longitudinal displacement if the joining of the individual handle portions into a common unit is accomplished by gearing provided on the individual handle surfaces. A further disadvantage is that the separated handle portions cannot be folded flat.

The present invention is an improvement over the prior art constructions, particularly in the provision of a handle, which includes two handle portions with means thereon for securing the handle portions together into a single handle unit, which securing means do not in any way interfere with the gripping surface of the individual handle portions.

In accordance with the invention, securing means such as interengageable gearings, or projections and recesses, are defined on the handle portions only at locations removed from the normal handle gripping area, or securing means such as one or more magnets are incorporated in the handle portions without materially changing the gripping surface to provide means for locking the handle portions together in a single unit, when desired. In the handle construction of the invention it is not necessary that the gripping portion be made rotatable, since the handle can be made with a gripping area which is maintained free of any projections or recesses which would undesirably mar the gripping surface. In addition, the handle portions may be made flat and may be constructed to lie in juxtaposition with the top wall of a suitcase with which they are used after they have been separated.

Accordingly, it is an object of the invention to provide an improved handle construction having separable handle portions which may be easily interengaged for forming a single handle unit.

A further object of the invention is to provide a handle with separable handle portions which may be interengaged to form a single handle unit, wherein the portions include means for securing the handle portions together in a unit, which securing means are constructed and located in a manner such that the handle gripping surfaces of the individual portions, as well as the whole handle, are not affected.

A further object of the invention is to provide a handle having two pivotably mounted handle portions which may be swung together for forming into a single handle unit, and wherein the portions include securing means, such as interengageable projections and recesses, which advantageously may be magnetic and which are located on the surfaces of the individual handle portions in a manner such that they do not affect the bearing surfaces of the handle portions.

A further object of the invention is to provide a handle construction for suitcases and the like, which includes two individual flat handle portions which may be pivotably moved together for joining together as a single handle unit, but which may be separated and pivoted in opposite directions for folding flat against the luggage with which they are associated.

A further object of the invention is to provide a handle which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a top plan view of a handle constructed in accordance with the invention, with the handle portions indicated separated and lying substantially flat;

FIG. 2 is a side elevational view of the handle indicated in FIG. 1;

FIG. 3 is a top plan view of another embodiment of the handle indicating the portions separated and lying substantially flat;

FIG. 4 is a side elevational view of the handle indicated in FIG. 3; and

FIG. 5 in a view similar to FIG. 4 of another embodiment of the invention.

Referring to the drawings in particular, the invention embodied therein comprises a handle generally designated 40, as indicated in FIGS. 1 and 2, which comprises a first substantially U-shaped generally flat handle portion 1 and a second substantially U-shaped and substantially flat handle portion 2. Each handle portion includes a substantially straight central gripping portion 1a and 2a, respectively, and side legs 1b and 1c and 2b and 2c respctively. The handles 1 and 2 are mounted for pivotal movement upwardly and downwardly on horizontal pivot pins 42 and 44, respectively, which are supported on brackets 48 and 50 which are riveted to a wall of a suitcase 46.

In accordance with a first feature of the invention, each of the handle portions 1a and 2a may be separated to lie substantially flat on the suitcase 46, and for this purpose at least the underside of each leg portion 1b, 1c, 2b, 2c is notched or recessed on exterior walls 14 and 15 of each handle portion, as indicated at 1d, to permit the handle portions to acommodate side projections or flanges of the respective brackets 48 and 50 of the suitcase and to thus lie perfectly flat against the suitcase top wall.

In accordance with another feature of the invention, the handle portions 1a and 1b are constructed with means to permit them to be secured together to form a single handle unit, as indicated in FIG. 2. In the embodiment illustrated, such means comprise gearings or sets of projections and recesses generally designated 52, which are advantageously arranged so as not to interfere with the gripping areas 1a and 2a of each handle portion 1 and 2. In the FIG. 1 embodiment, the gearings 52 advantageously comprise gear projections 3, 4, 5 and 6 and complementary grooves 7, 8, 9 and 10 arranged in each of the corners of the two equal handle portions 1 and 2 in a manner permitting projections on one handle portion to be interengaged with the recesses on the other handle portion. After the individual handle portions 1 and 2 are interengaged, they assume the position indicated in FIG. 2 in which the tooth projections 3 to 6 rest in the corresponding grooves 7 through 10. In this position the handle 40 can be employed as an ordinary suitcase handle.

When the handle portions 1 and 2 are separated, they may be positioned to lie flat on the top wall of the suitcase because the exterior surfaces 14 and 15 thereof are each provided with the recesses 1d to accommodate the flange projections of the mounting brackets 48 and 50 of the suitcase.

In the embodiment of FIG. 3, a handle generally designated 54 is provided which includes gripping portions 1' and 2' having gripping areas 1a' and 2a' and leg portions correspondingly designated in a manner similar to that of the embodiment of FIGS. 1 and 2. In the FIGS. 3 and 4 embodiment, gearings 52' advantageously include magnets 22, 23, 24 and 25 which cooperate to hold the handle portions 1' and 2' together, as indicated in FIG. 4. The magnets 22 and 23 are made to project from the interior or contacting surfaces of the handle portion 1' so that they may interengage in a recess in which the magnets 24 and 25 are positioned on the handle portion 2'.

It should be appreciated that in the embodiment indicated in FIGS. 3 and 4, the magnets are shown as being circular, but, of course, they can be of the same configuration as the projections or recesses of the gearings 52 indicated in FIGS. 1 and 2.

In FIG. 5 a modified version is indicated in which handle portions 1" and 2" are provided with magnets 23' and 24', respectively, which are arranged with their outer surfaces flush with the contacting surfaces of the two portions of the handle. Since these magnets 23' and 24' may be positioned flush with the contacting surface, it is true that they will not interfere with the gripping areas 1a and 2a (1a' and 2a') even if they are located directly in such areas, rather than in the corners as in the embodiments illustrated.

While specific embodiments of the invention have been shown and described in detail to illustrate the application of the inventive principles, it will be understood that the invention may be embodied otherwise without departing from such principles.

What is claimed is:

1. A handle construction particularly for suitcases, comprising first and second handle portions each having a central gripping portion of generally smooth contour around its periphery adapted to be pivotally mounted at each end on a common pivot for movement together to form a single handle unit and apart to form separate first and second handle portions, and securing means for securing each of said first and second handle portions together constructed and arranged to leave said central gripping portions of each handle portion unobstructed and free both when said handle portions are together and when separated, said securing means comprising at least one gearing disposed adjacent at least a corresponding one of the corners of each said handle portion, the respective gearings of said handle portions interengaging when said handle portions are brought together.

2. A handle construction comprising first and second substantially U-shaped handle elements, each of said substantially U-shaped handle elements having leg portions terminating at their outer ends with means for pivotally mounting said leg portions on a common pivot, said handle portions being adapted to be pivoted into juxtaposition with each other to form a single handle unit and to be separated for carrying by gripping of the separated handle elements, each of said handle elements including a central free bearing area for the positioning of one's hand therearound, and securing means on said handle elements for holding said handle portions together located away from said central gripping areas, said securing means comprising gearings with interengageable projections and recesses on the respective handle portions.

3. A handle construction according to claim 2, wherein at least some of said gearings are magnetic.

4. A handle construction comprising first and second substantially identical U-shaped handle elements, each of said U-shaped handle elements having leg portions terminating at their outer ends with means for pivotally mounting said leg portions on a common pivot, said first and second substantially identical U-shaped handle elements being mounted in opposite end-to-end relationship, said handle portions being adapted to be pivoted into adjusted position with each other to form a single handle unit and adapted to be pivoted apart and separated for carrying by gripping the separated handle elements, each of said handle elements including a central portion with a central free bearing area of generally smooth unobstructed configuration for positioning of one's hand therearound, and at least one first tooth projection and one first recess defined on said first and second handle elements adjacent one end of said central portion away from the central free bearing area, and at least one second recess laterally aligned with said first tooth projection and at least one second tooth projection laterally aligned with said first recess both defined adjacent the opposite end of said central portion away from the central free bearing area, said first tooth projection of one of said first and second handle elements being adapted to engage in said second recess of the other of said first and second handle elements and said first recess being adapted to receive said second tooth projection of the other of said handle elements when said handle elements are in a juxtaposition for forming a single handle unit.

5. A handle construction comprising first and second substantially identical U-shaped handle elements, each of said U-shaped handle elements having leg portions terminating at their outer ends with means for pivotally mounting said leg portions on a common pivot, said first and second substantially identical U-shaped handle elements being mounted in opposite end to end relationship, said handle portions being adapted to be pivoted into adjusted position with each other to form a single handle unit and adapted to be pivoted apart and separated for carrying by gripping the separated handle elements, each of said handle elements including a central free bearing area of generally smooth configuration for positioning of one's hand therearound and a leg portion at each end of said central area, and at least one first tooth projection and one first recess defined on said handle adjacent the juncture of said central free bearing area and one leg, and at least one second recess laterally aligned with said first tooth projection and at least one second tooth projection laterally aligned with said first recess defined adjacent the juncture opposite end of said central bearing area and the other said leg portion, said first and second tooth projections of one of said first and second handle elements being adapted to engage in said second and first recesses of the other of said handle elements when said handle elements are in a juxtaposition for forming a single handle unit.

References Cited by the Examiner

UNITED STATES PATENTS

| | | | |
|---|---|---|---|
| 720,803 | 2/1903 | Herrmann | 190—55 |
| 1,308,824 | 7/1919 | Walker | 217—125 |
| 2,398,436 | 4/1946 | Mason. | |
| 2,453,021 | 11/1948 | Konelsky. | |
| 2,461,201 | 2/1949 | Ellis. | |
| 3,111,736 | 11/1963 | Budreck | 317—201 |
| 3,140,038 | 7/1964 | Laguerre. | |

FOREIGN PATENTS

| | | |
|---|---|---|
| 745,102 | 5/1933 | France. |
| 1,308,141 | 9/1962 | France. |
| 800,880 | 12/1950 | Germany. |

JOSEPH R. LECLAIR, *Primary Examiner.*

FRANKLIN T. GARRETT, GEORGE O. RALSTON, *Examiners.*

J. F. McNULTY, *Assistant Examiner.*